(No Model.)
W. H. WRIGHT.
BALL BEARING.
No. 342,891.  Patented June 1, 1886.
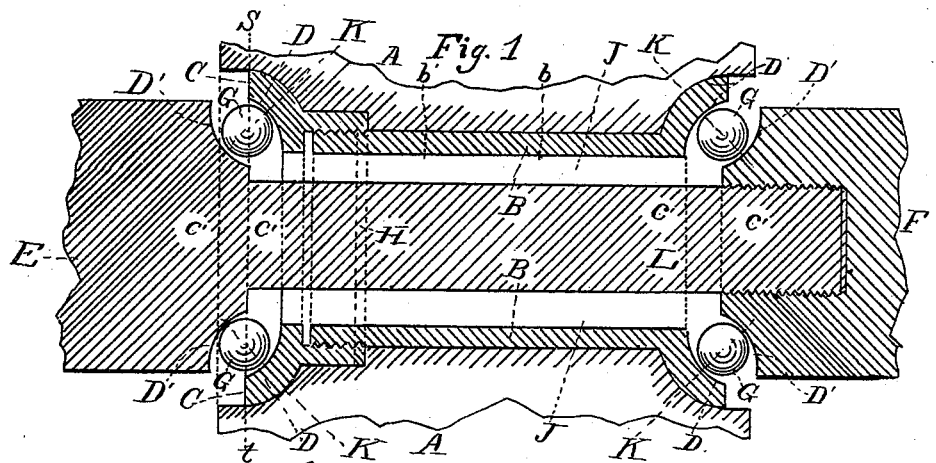
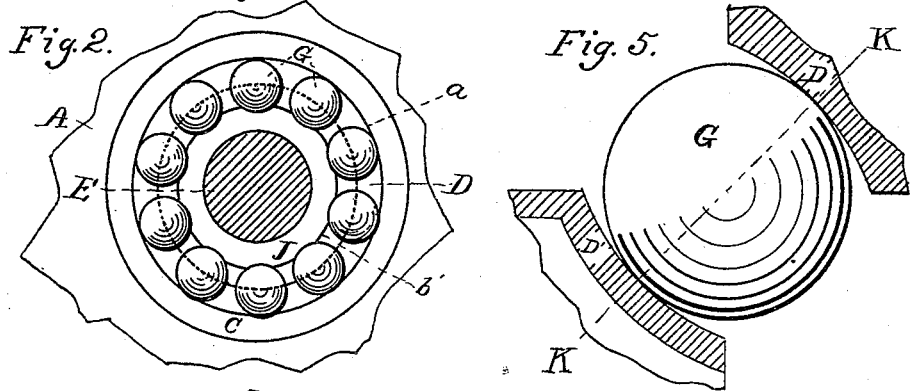
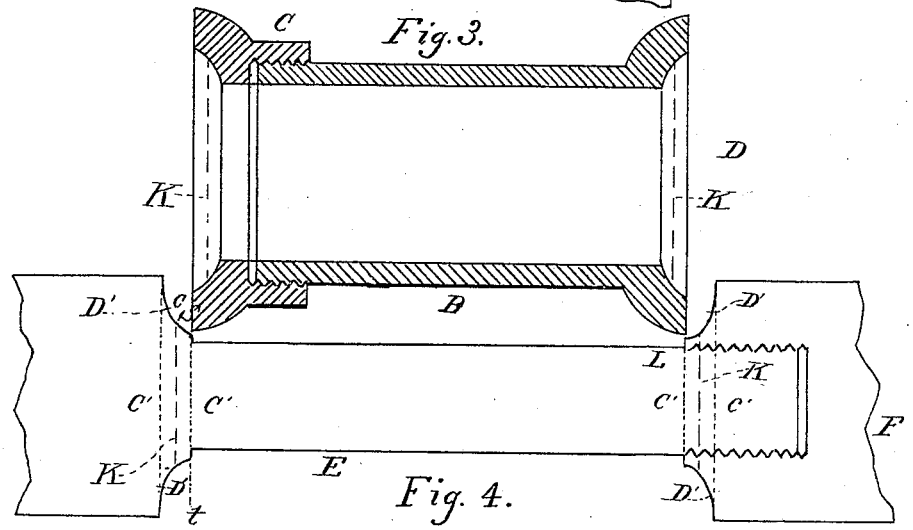
Witnesses,
S. E. Parker.
J. W. Parker
Inventor,
William H. Wright

UNITED STATES PATENT OFFICE.

WILLIAM H. WRIGHT, OF BUFFALO, NEW YORK.

BALL-BEARING.

SPECIFICATION forming part of Letters Patent No. 342,891, dated June 1, 1886.

Application filed October 24, 1885. Serial No. 180,877. (No model.)

*To all whom it may concern:*

Be it known that I, WILLIAM H. WRIGHT, of Buffalo, in the State of New York, have invented a new and useful Improvement in Ball-Bearings, of which the following is a full, clear, and exact description, reference being had to the accompanying drawings, in which similar letters refer to similar parts throughout the several views.

The object of my invention is to reduce and, so far as is practicable, obviate the friction which results in ordinary ball-bearings from surface-contacts between their several parts, and whenever the direction of pressure between them is changed. Such ordinary bearings provide, mainly, for the rotation of the balls in but one plane, and instead of point contacts are subjected to superficial contacts extending over a considerable portion of their surfaces, so that when the balls are subjected to pressure in a direction oblique to such plane, they occasion friction by failing to rotate freely or by being held or cramped.

Other objects are to provide for side-thrusts, secure steadiness, and the noiseless action of the moving parts, to provide compensation for any wear of the balls or bearings, for facilitating the adjustment of the parts, their subsequent examination or repair, to regulate the distance between the hub and shaft, and to permit a convenient change of balls of such sizes as may be desired.

My invention consists in providing grooved bearings the transverse sections of which shall exhibit a curve described upon a radius so much greater than that of the balls employed that there shall be at any given time only two points of contact diametrically opposite to each other between the balls and their opposite bearings, and in locating such bearings obliquely to a vertical or horizontal direction of rotation, so that the axis of rotation of each ball may freely change conformably with each change in the direction of pressure or force of impulsion, and thus act freely whether the pressure upon the balls be vertical or a side-thrust, or a resultant of both.

It also consists in the mode of securing such bearings in place and retaining the balls, and of an adjusting, regulating, and compensating device, as hereinafter more fully set forth, whereby the distance between the bearings may be adjusted and regulated, so as to admit of any desired play of the balls consistent with their retention between such bearings.

It also consists in limiting the area of such bearings to what is necessary for such retention, providing freer exposure of the balls to the atmosphere, and thereby keeping them cool by affording unimpeded radiation; in locating such bearings exteriorly where the contact edges of a hub ordinarily would be instead of interiorly as in the ordinary way of ball-bearings in the body of the hub or on the shaft. These objects I accomplish by interposing a series of balls susceptible of rotation freely in any direction and of any suitable and uniform size and material between the hub and the shaft in opposingly-faced shallow concave annular grooves, recessed upon and encircling hub and shaft, respectively, so as to present retaining concave bearings of such concavity that they shall each present but one point of contact at any time with each ball which they conjointly retain whatever the direction of pressure may be, and arranging such grooved bearings transversely opposite to each other at points where ordinarily are the central contact-edges of a hub and shaft, and so that the resultant line of equal forces would pass approximatively through the middle of each bearing, and the surface of the retained balls would be found solely in contact with each such bearing substantially at points in such middle lines, such bearings having a width sufficient to prevent the escape of the balls, and their opposite edges adjustably maintained to so retain the balls and cause them to bear the load at such points without contact between the hub and the shaft.

That others skilled in the art to which such bearings appertain may understand how to construct and use them, I further describe them with reference to the drawings hereto annexed.

Figure 1 is a longitudinal sectional view of my ball-bearing, showing the position of the balls G G G G interposed between the grooved bearing-seats D D D D, located at what I have herein designated as the central contact-edges. A A represent a portion of a hub which rigidly incloses a bearing-box, B B, provided with such bearing-seats. F is a part of a shaft which is coupled at L by a screw-joint with shaft-coupler F′, also provided with bearing-seats D′ D′ D′ D′ transversely opposite to similar seats upon the bearing-box. The dotted lines C′ C′ indicate the projection of the edges of the seats upon the shaft. Dotted line H indicates the end of the coupling in projection. Lines K K K K indicate the resultants of equal vertical and lateral pressure at the contact-edges and the relative position of the points of contact between the balls and the seats. J J is space between the bearing-box and shaft.

Fig. 2 is an end view of bearing-box B and a section of shaft E in the plane indicated in Figs. 1 and 4 by the letters *s t*. Dotted line B′ shows the inner line, *b′ b′*, of bearing-box in projection, and the line *a′* shows the other edge of the bearing-seat in projection, having the series of balls G G resting thereon in place. C is the face of coupler, of which D is bearing-seat. K is the projection of the line of point-contacts in the direction of the resultant when vertical and lateral pressures are equal.

Fig. 3 is a longitudinal sectional view of bearing-box B, showing coupler C engaged therewith by means of a screw-joint. The box and coupler united form the box, and the coupler may be screwed home or not, as may be desired. In this figure it is not screwed home, thus admitting further shortening of the box, if desired, after rigidly securing B inside the hub. K also shows resultant or point-contact line in projection as in the other figures.

Fig. 4 is a longitudinal sectional view of shaft E, showing shaft-coupler F engaged therewith by a screw-joint sunk in the coupler at L, and forming a shaft in place. In this figure the coupler is not screwed home, thus admitting of adjustment according to the size of balls employed or to compensate for wear. D′ D′ D′ D′ are bearing-seats, (shown in projection by dotted lines C′ C′ C′ C′,) intended to be of like concavity with and to face corresponding seats upon the bearing-box.

Fig. 5 is an enlarged plan of a transverse section of any ball and its seats, in which the curvature of the transverse section of each seat is described upon a radius equal to the diameter of the ball. In practice the curvature at each end may be increased so as to form the section of an ellipse upon its coordinate axis, so long as the portions of the seat affording contact points to the ball do not extend so far, thus establishing superficial instead of point-contacts, and thereby creating friction. Any regular curvature consistent with retaining the balls will answer which insures by its having its corresponding ordinates at the same distances from its major one greater than the same ordinates of a hemisphere equal to that of the ball employed, so that there may be at any given time but one point of contact between the ball and a seat.

It is apparent that the hub is constructed so that when coupled it shall present annular bearing-seats at the place which I have termed "contact-edges," concentric with the shaft for the balls interposed, rotating, and retained between each seat and a corresponding seat transversely opposite upon the shaft. Thus any vertical force or pressure is distributed transversely, and the balls, sustaining and transmitting pressure, consequently rotate upon axes determined by their points of contact. They therefore change such axes and the plane of rotation as the direction of pressure changes, though, as the space between the seats does not permit of escape of the balls, they also partake of a regular motion caused by the revolution of one of the contact-points, thus causing a constant change in the wearing or frictional points of contact both on ball and seat. It is evident that a bearing-box is unnecessary where the hub is of metal, as such seats may be integral with it. When the hub is of wood, each part of the box after adjustment may be rigidly secured to the hub by set-screws, or in any manner which will retain it in place while revolving. It is necessary that the shaft have a greater diameter on each side contiguous to and beyond the hub, and that for insertion into the hub it should be made in parts to be coupled to each other subsequent to insertion.

The coupling being adjustable, affords means of compensating for any wear of the balls or seats, and the parts are readily engaged or disengaged in place when desired.

When the part E has been inserted into the hub, and before adjusting the coupler F in place, the series of balls may be placed between the seats, and the coupler then screwed up until by adjustment slight contact is established between the balls and the opposing seats. The diameter of the balls must be greater than the distance left between the opposite edges of the seats, thus the balls will be retained without being entirely inclosed.

The bearing-seats are preferably of like concavity and preferably set transversely opposite to each other, as shown in the drawings. The contacts will thus be upon a hub side half of the upper hemisphere of any uppermost ball, and upon the opposite or shaft side half of its lower hemisphere, while the other halves will be free from contact for the time being, and thus without wear, pressure, heat, or friction, and as the constant change of the axes of rotation is bringing any point subjected to friction into frictionless exposure, such points are thereby cooled. It is a decided advantage in rapid revolution that such an arrangement of parts permits the circulation of currents of air between the hub and the axle between the balls, and over the area of the bearing-seats, which carry off frictional heat. In consequence I have found lubricants unnecessary, though from ready access to the parts lubricants may be applied if it be found at any time desirable.

It will be noticed that my mode of coupling by screw-joints in either the box-coupler or shaft-coupler, or both, admits of any desired adjustment of the bearing-seats, inspection, repair, or change in the parts when desired, as well as to compensate for wear.

I do not broadly claim as my invention anti-friction ball-bearings having lines or extended surfaces as contacts, as in ordinary ball-bearings; but What I do claim as my invention, which I desire to secure by Letters Patent, is—

1. A ball-bearing having point-contacts, composed of anti-friction balls interposed and rotating and revolving upon constantly-changing axes in any direction between a hub and a shaft, and retained and controlled in motion around such shaft by means of transversely-opposite annular seats whose transverse sectional curvature presents point-contacts with such balls, such seats being situated, respectively, upon such hub at its contact-edges and upon adjacent portions of the shaft enlarged and conformably adapted thereto, substantially as described.

2. In a ball-bearing, a cylindrical bearing-box having annular concave seats for balls at each end, provided for the reception, use, and control of anti-friction balls, substantially as described.

3. In a ball-bearing, a coupling-bearing box consisting of two parts, each part being provided with annular concave bearing-seats at one end and separably adapted to being coupled together at their other ends, substantially as described.

4. In a ball-bearing, the combination of anti-friction balls with an axle recessed to present changing point-contacts in annular bearing-seats, substantially as described.

5. A compound coupling-axle, consisting of parts, each part being adapted to engage with and removably or rigidly secured to the other or others and capable of engagement and disengagement at will therewith and therefrom, each part being provided with an annular concave ball-bearing seat, encircling such axle contiguous to and on each side of the hub-space thereof at an inclination with such axle.

WILLIAM H. WRIGHT.

Witnesses:
J. W. PARKER,
S. E. PARKER.